US006466420B1

(12) United States Patent
Chuniaud et al.

(10) Patent No.: US 6,466,420 B1
(45) Date of Patent: Oct. 15, 2002

(54) HIGH VOLTAGE DISCONNECTOR HAVING A MOVING CONTACT THAT IS MOVED AT HIGH SPEED

(75) Inventors: Olivier Chuniaud, Chamonix; Henri Jouard; Jean Marmonier, both of Aix les Bains; Bernard Regnier, Villefontaine, all of (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/571,895

(22) Filed: May 16, 2000

(30) Foreign Application Priority Data

May 17, 1999 (FR) ........................................ 99 06212

(51) Int. Cl.[7] ............................................ H02H 3/00

(52) U.S. Cl. .............................. 361/2; 361/3; 361/4

(58) Field of Search .............................. 361/2–4, 134, 361/135, 131; 218/7, 8, 10, 12, 14, 16–19, 67, 120, 143; 200/400, 38 E, 237–262

(56) References Cited

U.S. PATENT DOCUMENTS 3,811,022 A 5/1974 Guidosh ................. 200/144 B
4,414,449 A * 11/1983 Garzon ................... 200/146 R
4,636,602 A * 1/1987 Hall et al. .................. 200/153
5,756,952 A * 5/1998 Thuries ......................... 218/7
5,841,614 A * 11/1998 Perret .......................... 361/14
5,959,274 A * 9/1999 Perret .......................... 218/67

FOREIGN PATENT DOCUMENTS

BE 789 990 A 4/1973
DE 27 58 264 A1 7/1979
DE 0 348 6485 A2 1/1990

* cited by examiner

*Primary Examiner*—Stephen W. Jackson
(74) *Attorney, Agent, or Firm*—Sughrue Mion, PLLC

(57) ABSTRACT

A high voltage electrical disconnector that has a moving contact that moves at high speed comprises a moving first contact which is mounted to move along an axial direction relative to a fixed second contact, and which co-operates therewith to establish an electrical connection, and a rod extending along said axial direction and which is driven to move the first contact relative to the second contact. The first contact is a hollow tube in which there slides a piston mounted on the rod. A first spring is interposed between the moving contact and a first end of the piston, and a second spring is interposed between moving contact and a second end of the piston. A first locking system is provided to prevent the moving contact from moving during a closure operation while the first spring is simultaneously being compressed, the first locking system retracting after the first spring has been compressed by a certain amount so that the moving contact is connected to the fixed contact under the effect of the first spring relaxing. A second locking system is provided to prevent the moving contact from moving during an opening operation while the second spring is being compressed by the piston, said second locking system retracting after the second spring has been compressed by a certain amount so that the moving contact is disconnected from the fixed contact under the effect of the second spring relaxing.

5 Claims, 3 Drawing Sheets

HIGH VOLTAGE DISCONNECTOR HAVING A MOVING CONTACT THAT IS MOVED AT HIGH SPEED

The invention relates to an electrical disconnector comprising a first contact which is mounted to move in an axial direction relative to a fixed second contact and which co-operates therewith to establish an electrical connection, and a rod which extends along the axial direction and which is driven to move the first contact relative to the second contact.

The invention applies more particularly to a high voltage electrical disconnector having a metal case in which the moving and fixed contacts are located, the case being filled with a dielectric gas such as $SF_6$. The rod for driving the moving contact passes through the metal case in a sealed manner and it is usually displaced in translation by a mechanical control means.

BACKGROUND OF THE INVENTION

Patent application EP 0 348 645 discloses a disconnector having two moving contacts formed by two coaxial cylinders and displaced so as to be connected successively to a fixed arcing contact and to a fixed permanent contact (for passing the permanent current). The control mechanism for controlling the moving contacts uses two aligned helical springs that are separated by a collar fixed to a drive rod which is in axial alignment with said springs. The disconnector arrangement disclosed enables the moving contacts to have a travel speed that is much faster than that of the drive rod during the operations of opening or closing the electrical connection.

In general, when the disconnector is operated on capacitive current (of low amperage under very high voltage), electric arcs are created between the moving contact and the fixed contact and generate very high frequency line transients (of MHz order) which are harmful to the connected equipment. The faster the disconnector, the smaller the number of arcs struck. To this end, the above-mentioned patent application uses a moving arcing contact that is moved at high speed to connect or disconnect a fixed arcing contact which can also be called a "transient-current contact". Just after said arcing currents have been connected, the permanent contacts can be moved towards each other and connected together without striking an electric arc.

However, the two-stage connection provided by the two moving contacts in such a device does not deal with certain problems:

Firstly, despite the reduction in the number of arcs struck as a result of the increased switching speed, each high voltage front nevertheless remains harmful to the connected equipment. In order to reduce the steepness and the height of said fronts, it is,known to use resistors connected to the fixed arcing contact. If the current produced by the arcs being struck passes in full via said resistors, the fronts are damped considerably.

As a result of the disposition of its fixed contacts, the above-mentioned device does not enable electric arcs to be struck only on the fixed arcing contact. The insulating distance between the moving arcing contact and the fixed permanent contact can become insufficient if the voltage exceeds a certain threshold, in which case arcs may be struck between the contacts, resulting in harmful voltage surges since the voltage is not attenuated by any resistors.

In addition, such a device having two moving contacts implies that a transient current will flow while waiting for the permanent contacts to be connected. As a result of the limited section of the moving arcing contact, the transient current must remain beneath a critical threshold, beyond which the amount of heat produced would be harmful to the arcing contacts, particularly since this current lasts for a long time. This problem occurs specifically when switching the disconnector on busbar transfer current, which can be as great as thousands of amps.

OBJECTS AND SUMMARY OF THE INVENTION

In order to remedy the drawbacks of the prior art, the invention provides an electrical disconnector comprising a first contact which is mounted to move along an axial direction relative to a fixed second contact and which co-operates therewith to establish an electrical connection, and a rod which extends along said axial direction and which is driven to move the moving contact relative to the fixed contact, wherein the moving contact is a hollow tube having a first end which faces the fixed contact and a second end opposite to the first end, wherein the disconnector comprises a piston slidable inside the moving contact, the piston being mounted on the rod and having a first end facing towards the fixed contact and a second end opposite from the first end, wherein a first spring is interposed between the first end of the moving contact and the first end of the piston, wherein a second spring is interposed between the second end of the moving contact and the second end of the piston, wherein a first locking system is provided to lock the moving contact in the axial direction during a closure operation at the same time as the first spring is compressed between the piston and the first end of the moving contact, said first locking system retracting after the first spring has been compressed by a certain amount so that the moving contact is connected to the fixed contact under the effect of the first spring relaxing, and wherein a second locking system is provided to prevent the moving contact from moving in the axial direction during an opening operation while the second spring is being compressed between the piston and the second end of the moving contact, said second locking system retracting after the second spring has been compressed by a certain amount so that the moving contact is disconnected from the fixed contact under the effect of the second spring relaxing.

The device enables high voltages to be switched at high speed while enabling high currents to be passed.

BRIEF DESCRIPTION OF THE DRAWINGS

Other characteristics and advantages will appear better on reading the following description of an embodiment of a disconnector of the invention as shown in the drawings.

MORE DETAILED DESCRIPTION

Figure 1:
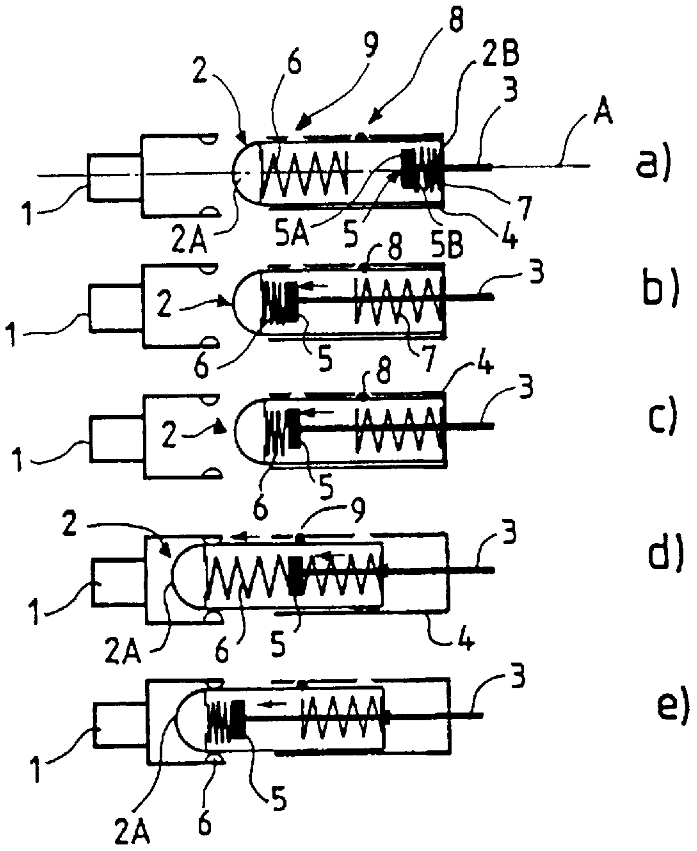
FIGS. 1*a* to 1*e* are diagrams showing the operation of the disconnector of the invention during closure of the electrical connection.

The electrical disconnector of the invention is a high voltage disconnector comprising a cylindrical metal case (not shown in the drawings) extending along an axial direction A and filled with an insulating gas such as $SF_6$. The case contains a contact 1 which is fixed and, for example, hollow, and a contact 2 which is mounted to move along the axial direction relative to the fixed contact. By way of example, the moving contact is in the form of a rod, is in axial alignment with the fixed contact 1, and is inserted in the hollow fixed contact in order to establish an electrical connection.

The disconnector also has a rod 3 in axial alignment with the contacts 1 and 2, extending along the axial direction A and suitable for being driven to move the contact 2 relative to the contact 1.

Figure 2:
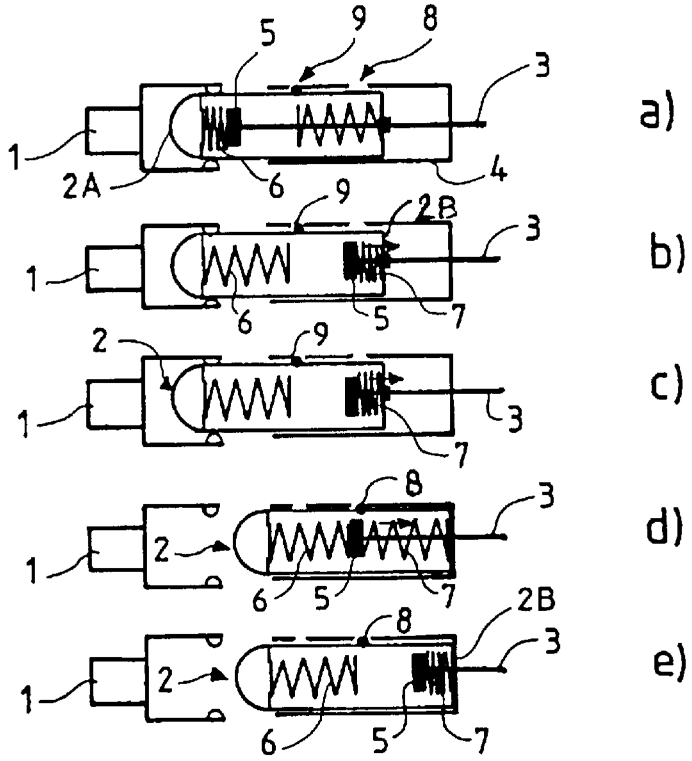
FIGS. 2*a* to 2*e* are diagrams showing the operation of the disconnector of the invention during opening of the electrical connection.

In FIGS. 1 and 2, the moving contact 2 is guided to travel along the axial direction by a fixed tube 4 disposed coaxially around the drive rod 3.

According to the invention, the moving contact 2 is a hollow cylindrical tube having a first end 2A facing the fixed contact 1 and a second end 2B opposite from the end 2A and having the drive rod 3 passing therethrough. A piston 5 is slidably mounted inside the contact 2; it has a first end 5A facing towards the contact 1 and a second end 5B opposite from its end 5A.

In FIGS. 1 and 2, the piston 5 is fixed to the end of the rod 3 which slides in the contact 2. As described below with reference to FIG. 3, the rod 3 can be a worm screw, in which case the piston 5 can be a nut.

A first spring 6, e.g. a coil spring is interposed between the first end 2A of the contact 2 and the first end SA of the piston. A second spring 7, e.g. a coil spring, is interposed between the second end 2B of the contact 2 and the second end 5B of the piston.

The other end of the rod 3 is connected to the control means of the disconnector (not shown) which acts in this case to move the rod 3 in translation along the axial direction A. In particular, during an operation of closing the disconnector, the control means acts to move the rod 3 and thus the piston 5 towards the fixed contact 1, and during an operation to open the disconnector, the control means acts to move the rod 3 and thus the piston 5 in the opposite direction.

The disconnector also has a first locking system 8 of the retractable ball type which prevents the contact 2 from moving in the axial direction when the rod 3 is driven during an operation to close the disconnector, and at the same time the first spring 6 is compressed between the piston and the end 2A of the contact 2. This first locking system retracts after the first spring 6 has been compressed by a certain amount so that the contact 2 is then connected at high speed with the contact 1 under the effect of the spring 6 relaxing while bearing against the piston 5.

The disconnector also has a second locking system 9 which prevents the contact 2 from moving in the axial direction when the rod 3 is driven during an operation to open the disconnector, and at the same time the spring 7 is compressed between the piston 5 and the second end 2B of the contact 2. This second locking system retracts after the spring 7 has been compressed by a certain amount so that the contact 2 is disconnected from the contact 1 at high speed under the effect of the spring 7 relaxing while bearing against the piston 5.

The operation of the disconnector of the invention is described below for a closing operation with reference to FIGS. 1*a* to 1*e*, and for an opening operation with reference to FIGS. 2*a* to 2*e*.

In FIG. 1*a*, the disconnector of the invention is in its fully open position. The spring 7 is compressed between the piston 5 and the end 2B of the contact 2. The spring 6 is fully relaxed between the end 2A of the contact 2 and the piston 5. The contact 2 is prevented from moving in the axial direction A inside the guide tube 4 by the retractable ball locking system 8 which is engaged in this case.

In FIG. 1*b*, the rod 3 is moved in translation towards the fixed contact 1 as indicated by the arrow on the piston 5; the rod drives the piston 5 in this direction, thereby causing the spring 6 to be compressed by the piston 5 against the end 2A of the contact 2, while the spring 7 is relaxed.

In FIG. 1*c*, after the piston 5 has moved a certain distance inside the contact 2, and thus after a certain amount of compression has been stored in the spring 6, the ball locking system 8 is retracted, thereby releasing the contact 2 to move inside the tube 4.

In FIG. 1*d*, the contact 2 penetrates at high speed into the fixed contact 1 under drive from the spring 6 which relaxes between the piston 5 and the end 2A of the contact 2. The piston 5 continues to move towards the fixed contact 1 and the second ball locking system 9 is engaged to prevent the contact 2 from moving inside the guide tube 4 in the axial direction A.

In FIG. 1*e*, the piston 5 continues to move towards the fixed contact 1, thereby causing the spring 6 to be compressed between the piston 5 and the end 2A of the contact 2. The disconnector is in its fully closed position which is guaranteed in positive manner because the rod 3 and thus the piston 5 have been displaced until the spring 6 is compressed and are therefore in a position where the moving contact is mechanically obliged to be inserted in the fixed contact.

During this closing operation, the moving contact 2 is thus moved independently of the drive rod 3 and of the piston 5. The travel speed in translation of the drive rod 3 and thus of the piston 5 can therefore be much slower than the travel speed of the moving contact 2. In addition, the travel speed of the drive rod 3 and thus of the piston 5 can be constant, unlike the travel speed of the moving contact 2. The end of the operation of closing the disconnector can be monitored by detecting the extreme position of the piston 5 and of the rod 3.

In FIG. 2*a*, the disconnector is in its fully closed position corresponding to the position shown in FIG. 1*e*. The contact 2 is prevented from moving along the axial direction A inside the guide tube 4 because the locking system 9 is engaged.

In FIG. 2*b*, the rod 3 is moved in translation away from the fixed contact 1, as shown by the arrow on the piston 5; it entrains the piston 5 in the same direction which causes the spring 7 to be compressed by the piston 5 against the end 2B of the contact 2, while the spring 6 is relaxed.

In FIG. 2*c*, after the piston 5 has moved a certain distance inside the contact 2 and thus cause a certain amount of compression to be stored in the spring 7, the ball locking system 9 is retracted, thereby releasing the contact 2 so that it can move inside the tube 4.

In FIG. 2*d*, the contact 2 disengages from the fixed contact 1 at high speed under drive from the spring 7 which relaxes between the piston 5 and the end 2B of the contact 2. Simultaneously, the piston 5 continues to move away from the fixed contact 1 and the first ball locking system 8 is engaged to prevent the contact 2 from moving inside the guide tube 4 in the axial direction A.

In FIG. 2*e*, the piston 5 continues to move away from the fixed contact 1, thereby compressing the spring 7 between the piston 5 and the end 2B of the contact 2. The disconnector is in its fully open position and this is guaranteed in positive manner because the rod 3 and thus the piston 5 have been moved until the spring 7 is compressed i.e. they are in a position where the moving contact is necessarily withdrawn mechanically from the fixed contact.

During this operation of opening the disconnector, the moving contact 2 is thus again moved independently of the drive rod 3 and the piston 5. Again the end of the disconnector-opening operation can be monitored by detecting an extreme position for the piston 5 and the rod 3.

Figure 3:
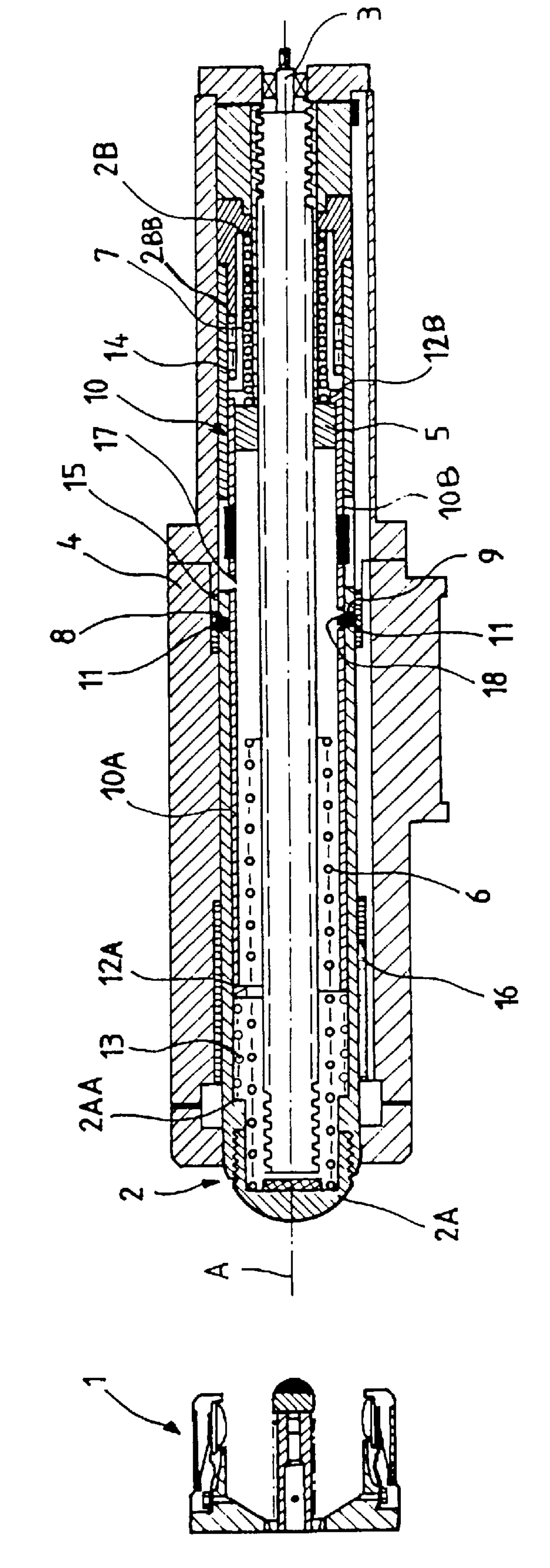
FIG. 3 is a longitudinal section view showing the detail of an embodiment of a disconnector of the invention in which the drive rod is a worm screw.

FIG. 3 is a longitudinal section including the axis A and shows an embodiment of a disconnector of the invention in greater detail. In this embodiment, the drive rod 3 is a worm screw mounted to rotate on the axis A. The piston 5 is a nut in which the worm screw 3 is engaged. Depending on the direction of rotation of the worm screw 3, the nut 5 which is prevented from rotating moves in translation in one direction or the other along the axis A inside the moving contact 2. On respective sides of the nut 5 there are disposed the coil spring 6 and the coil spring 7. FIG. 3 shows the disconnector in its fully open position, the spring 7 being compressed between the nut 5 and the end 2B of the moving contact 2.

A cylindrical slide 10 is located inside the contact 2 coaxially about the nut 5. This slide slides over the nut 5 and acts on the retractable balls 8 and 9 of the locking systems received in radial openings 11 in the contact 2. More particularly, the slide is constituted by two half-slides 11A and 10B that are independently displaceable along the axis A.

The half-slide 10A has a radial end rib 12A against which the nut 5 comes into abutment during displacement towards the fixed contact 1. The half-slide 10B also has a radial end rib 12B against which the nut 5 comes into abutment while moving away from the fixed contact 1. Furthermore, a coil spring 13 is disposed between the end rib 12A of the half-slide 10A and a shoulder 2AA provided at the end 2A of the contact 2, and another coil spring 14 is disposed between the end rib 12B of the half-slide 10B and a shoulder 2BB provided at the end 2B of the contact 2. These springs 13 and 14 serve to return the half-slides 10A and 10B when the nut 5 lies axially between the ribs 12A and 12B.

As can be seen in FIG. 3, the guide tube 4 has a first recess 15 in which the ball 8 can engage, and a second recess 16 in which the ball 9 can engage. These two recesses 15 and 16 are spaced apart from each other in the axial direction A. Furthermore, the half-slide 10A has a first recess 17 into which the ball 8 can retract, and the half-slide 10B has a second recess 18 into which the ball 9 can retract. These two recesses 17 and 18 are spaced apart from each other along the axial direction A.

When the ball 8 is engaged in the recess 15 of the tube 4, it locks movement of the contact 2 along the axial direction A, and when the rib 12A of the half-slide 10A is pushed by the nut 5 during closure of the disconnector, the ball 8 comes into register with the recess 17 into which it can retract so as to release the moving contact 2 for movement. Also, when the ball 9 is engaged in the recess 16 of the tube 4, it locks the contact 2 against movement along the axial direction A, and when the rib 12B of the half-slide 10B is pushed by the nut 5 during opening of the disconnector, the ball 9 comes into register with the recess 18 into which it can retract so as to release the moving contact 2 for movement.

In FIG. 3, the ball 8 is engaged in the recess 15 of the tube 4 while the ball 9 is retracted in the recess 18 of the half-slide 10B. This configuration of the disconnector corresponds to that shown in FIG. 1*a*).

When the nut 5 is moved towards the contact 1 during a closure operation, the nut 5 comes into abutment against the radial rib 12A of the half-slide 10A and moves the half-slide 10A to bring the recess 17 into register with the ball 8 so as to enable said ball to retract. This position of the disconnector corresponds to the position shown in FIG. 1*c*. Furthermore, when the ball 9 comes into register with the recess 16, the return spring 14 pushes the half-slide 10B, thereby causing the ball 9 to engage into the recess 16 and the recess 18 to go beyond the position of the ball 9, thereby locking the contact 2 with the guide tube 4. This position of the disconnector corresponds to that shown in FIG. 1*c*.

Starting from a closed position of the disconnector, when the nut 5 is remote from the contact 1, it comes into abutment against the rib 12B of the half-slide 10B and moves the half-slide 10B so as to bring the recess 18 into register with the ball 9, thereby enabling said ball to retract. This position of the disconnector corresponds to that shown in FIG. 2*c*. Furthermore, when the ball 8 comes into register with the recess 15 the return spring 13 pushes the half-slide 10A so as to cause the ball 8 to engage in the recess 15 and the recess 17 to go beyond the position of the ball 8, thereby locking the contact 2 relative to the guide tube 4. This position of the disconnector corresponds to that shown in FIG. 2*d*.

Figure 4:
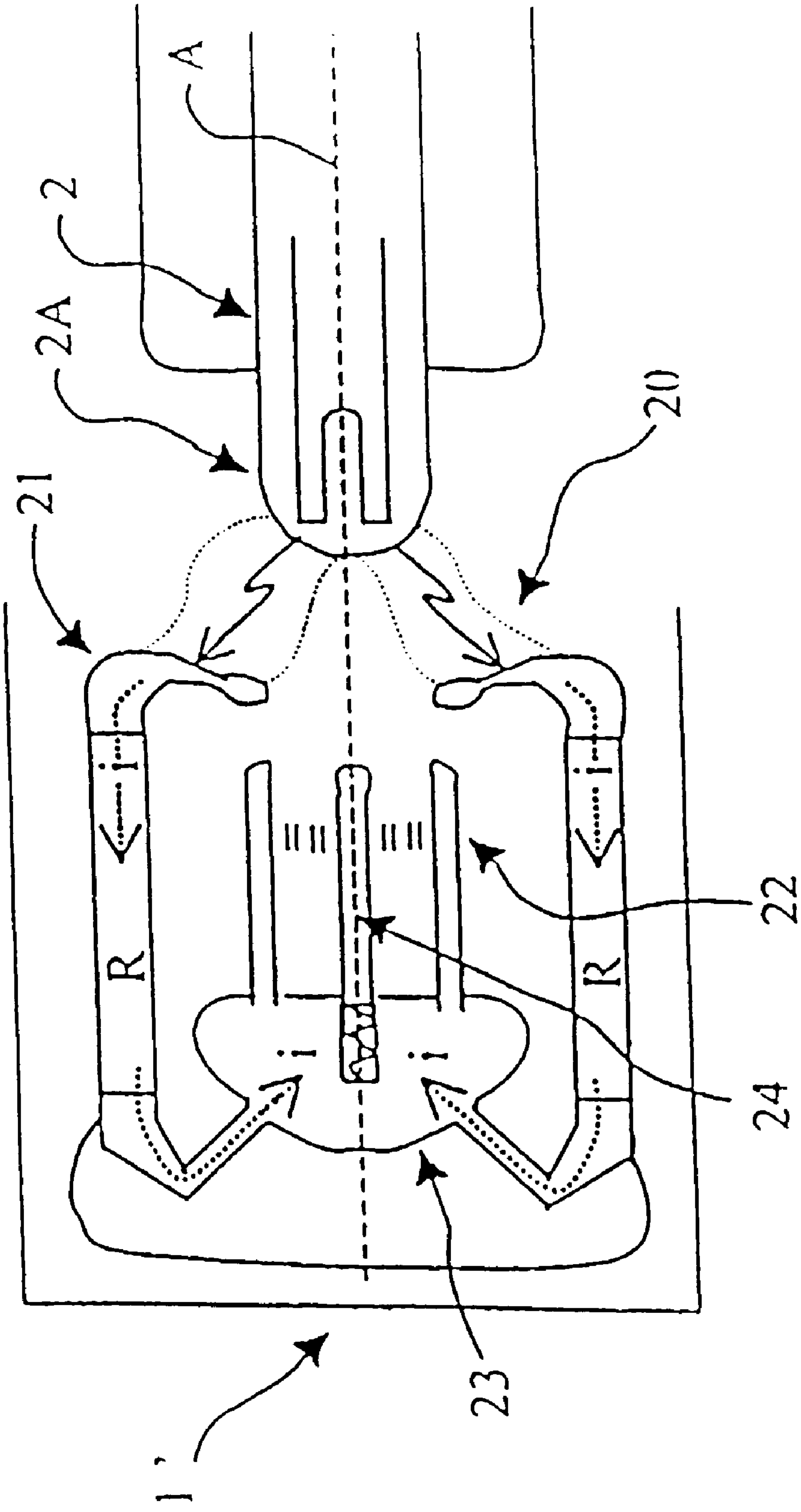
FIG. 4 is a longitudinal section view showing the detail of an embodiment of a disconnector of the invention in which the fixed contact is fitted with resistors.

In FIG. 4, in a preferred embodiment of a disconnector of the invention, the fixed contact 1' is fitted with resistors R enabling a particularly effective apparatus to be obtained to protect the connected equipment from very high frequency line transients during switching of the disconnector on capacitive current. In order to channel the electric arc 20, the fixed contact 1' comprises an arcing contact or cap 21 that is directly connected to the resistors R and only to the resistors. The cap has curved angles creating a corona-protection effect, and an inside diameter that is slightly greater than the diameter of the moving contact 2, so that the moving contact does not touch the cap. When an electric arc 20 is struck between the end 2A of the moving contact 2 and the cap 21, it is channeled in full to the resistors R, and the current i passes through said resistors so as to be evacuated towards a conductor 23 which is typically connected to a busbar. The arcs 20 are thus guided by the cap 21 until connection is made with the permanent contact 22.

In addition, in order to be able to guarantee switching of high busbar transfer currents without running the risk of melting the contacts, the permanent contact 22 conventionally houses, along its axis of symmetry, a retractable arcing contact 24 that is formed by a conductive rod coupled to a spring. The rod, also shown in the fixed contact 1 in FIG. 3, is constituted by a material that is insensitive to heating and that can support high currents when said rod is pushed by the moving contact 2. Furthermore, the amount of heat produced is limited by the fact that the moving contact is connected to the permanent contact 22 a very short time later.

What is claimed is:

1. An electrical disconnector comprising:

a first contact;

a second contact, which is mounted to move along an axial direction relative to said first contact which is fixed in said direction and which co-operates therewith to establish an electrical connection;

a rod which extends along said axial direction and which is driven to move said second contact relative to said first contact, wherein said second contact is a hollow tube having a first end which faces said first contact and a second end opposite to the first end, a piston slidable inside said second contact, said piston being mounted on said rod and having a first end facing towards said first contact and a second end opposite from the first end;

a first spring interposed between the first end of said second contact and the first end of said piston;

a second spring interposed between the second end of said second contact and the second end of said piston;

a first locking system provided to lock said second contact in the axial direction during an operation of closing the disconnector at the same time as said first spring is compressed between said piston and the first end of said second contact, said first locking system retracting after said first spring has been compressed by a certain amount so that said second contact is connected to said first contact under the effect of said first spring relaxing; and a second locking system provided to prevent said second contact from moving in the axial direction during an opening operation while said second spring is being compressed between said piston and the second end of said second contact, said second locking system retracting after said second spring has been compressed by a certain amount so that said second contact is disconnected from said first contact under the effect of said second spring relaxing.

2. A disconnector according to claim 1, wherein said first and second locking systems are retractable balls.

3. A disconnector according to claim 1, wherein said rod is a worm screw and said piston is a nut in which the worm screw is engaged.

4. A disconnector according to claim 1, wherein said rod is moved in translation and said piston is fixed to one end of said rod.

5. A disconnector according to claim 1, wherein said contact comprises a permanent contact and an arcing contact connected to resistors, and wherein the current produced by electric arcs being struck passes in full via said resistors, when said second contact is moving into contact.

* * * * *